March 15, 1938.  E. G. HODGE  2,111,185
SAUSAGE TWISTING MACHINE
Filed May 28, 1935  3 Sheets-Sheet 1
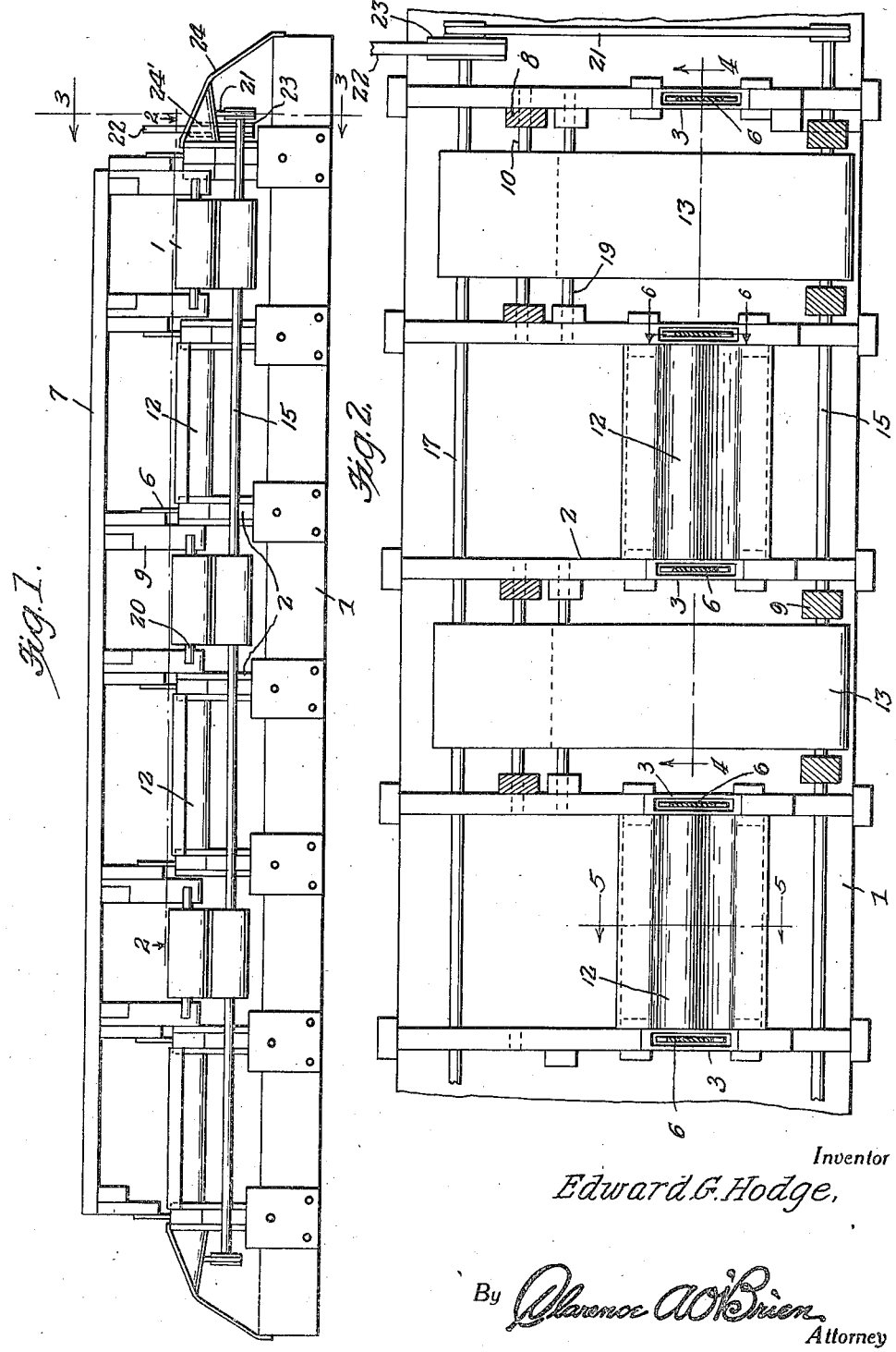
Inventor
Edward G. Hodge,
By Clarence A. O'Brien
Attorney

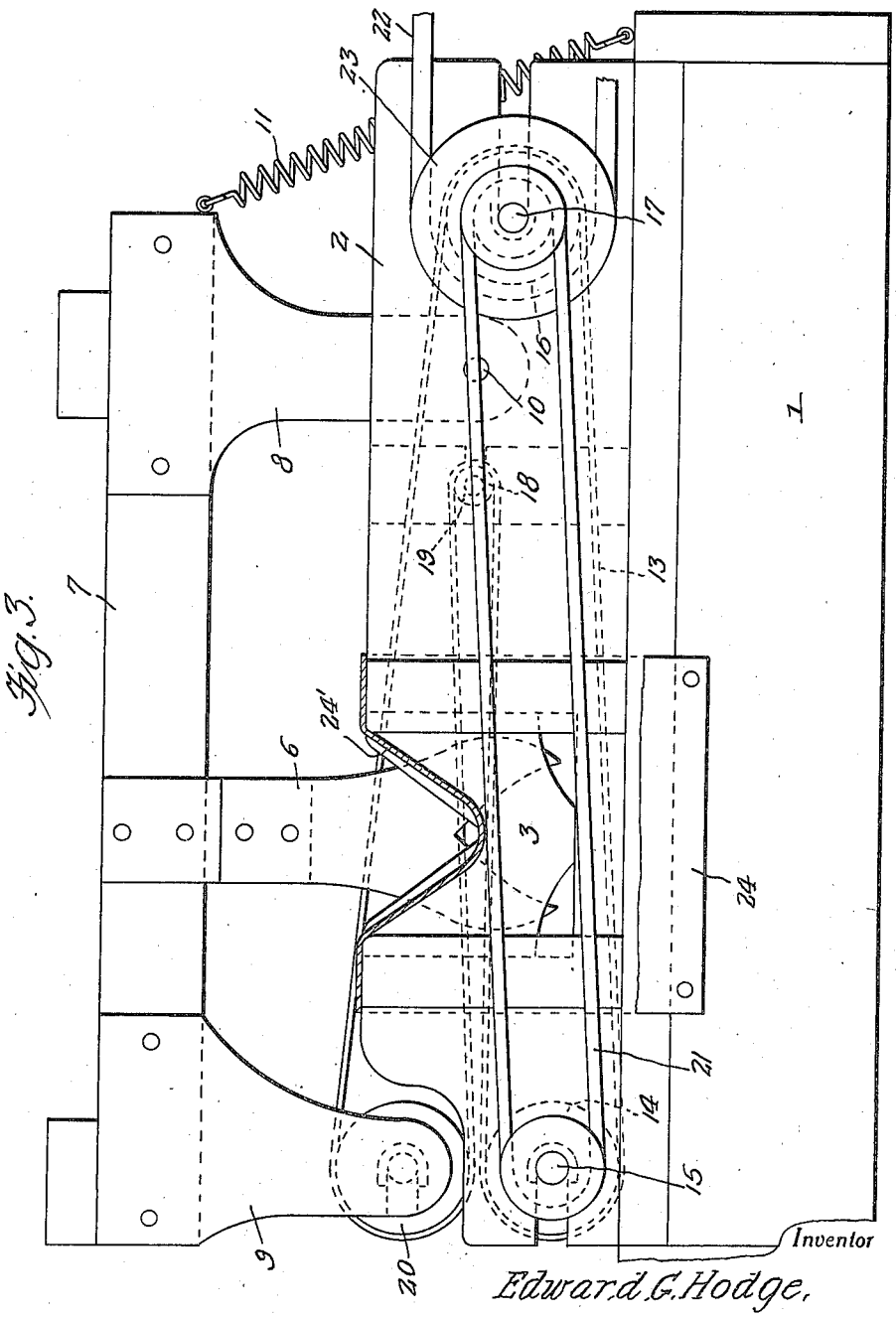

March 15, 1938.  E. G. HODGE  2,111,185
SAUSAGE TWISTING MACHINE
Filed May 28, 1935   3 Sheets-Sheet 3
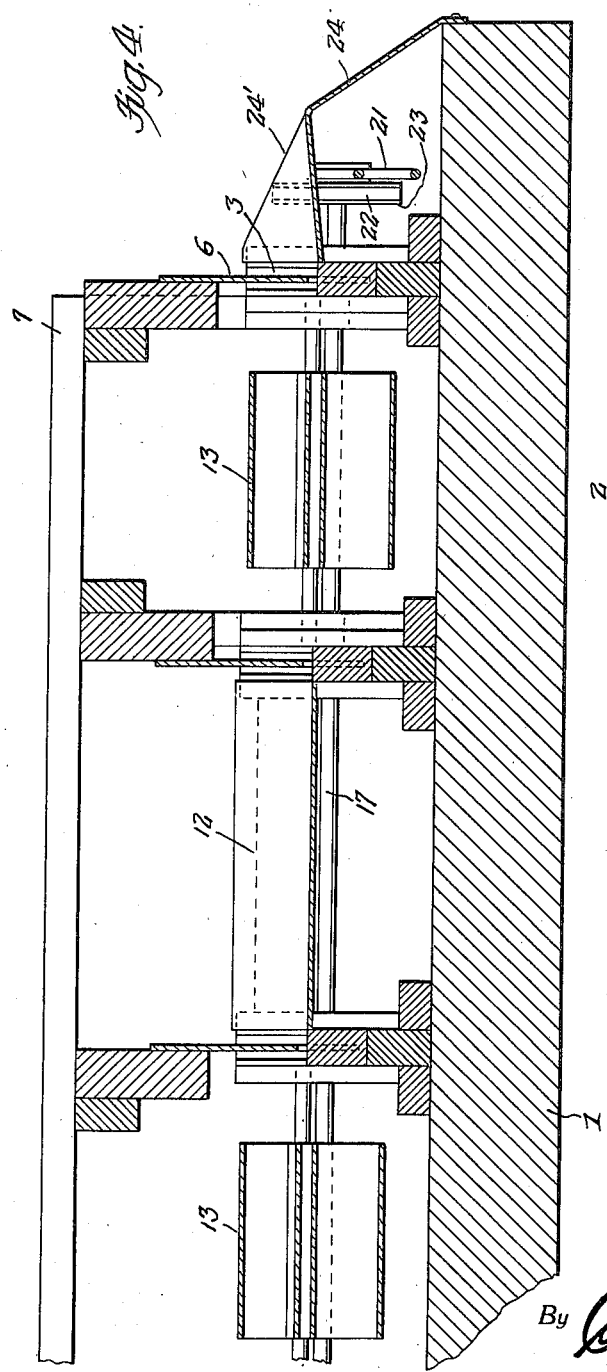
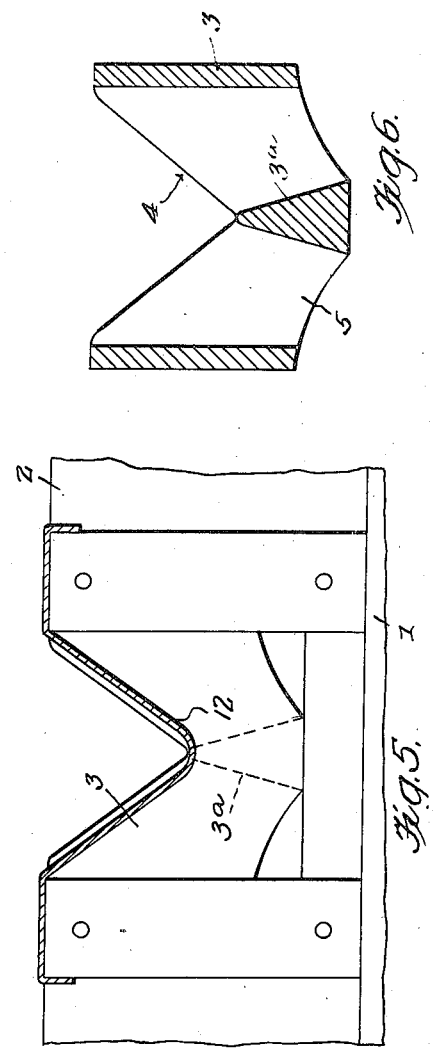
Inventor
Edward G. Hodge,
By Clarence A. O'Brien
Attorney Patented Mar. 15, 1938

2,111,185

UNITED STATES PATENT OFFICE 2,111,185

SAUSAGE TWISTING MACHINE

Edward George Hodge, Fall River, Mass.

Application May 28, 1935, Serial No. 23,932

1 Claim. (Cl. 17—34)

This invention relates to a sausage twisting machine for forming "links" in a length of filled sausage casing, the general object of the invention being to provide a plurality of pairs of jaws for forming constrictions in the length of the casing and belt means for twisting those portions of the casing between every other two sets of jaws, whereby the length of the casing is formed into links with but every other link engaged by the belt means.

A further object of the invention is to construct and arrange the parts that the device can be easily cleaned and repaired.

This invention also consists in certain other features of construction and in the combination and arrangement of several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a front view of the device.

Figure 2 is an enlarged sectional view of the device taken along the line 2—2 of Figure 1.

Figure 3 is an enlarged sectional view taken along the line 3—3 of Figure 1.

Figure 4 is a vertical longitudinal sectional view through a part of the device.

Figure 5 is a section on the line 5—5 of Figure 2.

Figure 6 is a vertical longitudinal sectional view through one of the lower jaws taken substantially on the line 6—6 of Figure 2 with other parts of the apparatus removed.

In these drawings the numeral 1 indicates the base of the machine and the numeral 2 indicates a plurality of longitudinally spaced transversely extending members supported on the base and each member has a vertical opening therein formed at its side walls with guideways or the like for removably receiving a lower jaw 3, shown in detail in Figure 6. Said jaw has a V-shaped recess 4 in its upper end and it is also provided with the diverging slots or openings 5 defined by the tapering divider 3a for receiving the prongs of the upper jaw 6. One of these upper jaws is provided for cooperation with each lower jaw and these upper jaws depend from a frame 7 which is provided with the rear depending parts 8 and the front depending parts 9, the lower ends of the parts 8 being pivotally connected to the members 2 by a rod 10 so that the frame 7 can be swung on this rod 10, a spring 11 being connected to the rear end of the frame and to the rear part of the base for normally holding the frame in upward position. A longitudinally extending trough 12 is supported between every other one of the pairs of members 2 and these troughs are in substantial alignment with the V-shaped openings 4 of the lower jaws 3. Belts 13 are placed between the other pairs of members 2, each belt extending transversely and said belts at the front of the machine pass over the rollers 14 arranged on a shaft 15 and said belts passing over rollers 16 carried by a shaft 17 at the rear of the machine and the belts also pass over small rollers 18 carried by an intermediate shaft 19. The belts also pass over the rollers 20 rotatably supported in the lower ends of the depending members 9 of the frame 7. As shown in full and dotted lines in Figure 3 each belt extends from the lower part of a roller 16 over a roller 14, then rearwardly over a roller 18, then forwardly over a roller 20 and back to the roller 16. Thus as the frame 7 is swung upwardly the portion of the belt passing over the roller 20 is raised and separated from that portion of the belt which extends from a roller 14 to a roller 18.

The shafts 15 and 17 are connected together at each end of the machine by the belt and pulleys shown generally at 21 and the shaft 17 can be driven from any suitable source of power by a belt 22 passing over a pulley 23 on the shaft 17. A combined shield and trough 24 is located at each end of the machine and protects the driving connections 21 between the shafts 15 and 17, the trough portions 24' being in alignment with troughs 12.

With the frame 7 in raised position a length of filled sausage casing is pulled through the troughs and the lower jaws 3 and over those portions of the belts which extend between the rollers 14 and 18. Then the frame 7 is swung downwardly and when this is done portions of the casing will be constricted by the sets of jaws 3 and 6. As this frame is swung downwardly and reaches a certain position the upper portions of the belts come in contact with the casing and in conjunction with the lower portions will exert a revolving motion to those parts of the casing directly in contact with the belts so that the portions of the casing engaged by the belts will be twisted at the constrictions, but as the belts are of elastic material the twisting action will not occur until the frame has been brought down far enough to allow the jaws to constrict the casing sufficiently to overcome the resistance to twisting. If the twisting belts were not elastic the casing would be ruptured if the downward motion of the frame was continued beyond the point where the sausage came in contact with both the upper and lower parts of the belts. Stretching of the belts however compensates for differences in the diameter of the individual lengths of casings as well as for the differences in the degree of hardness to which the casings are stuffed.

The frame should be held down long enough to twist the sausage four full turns. After the twists are made the frame is released so that the spring 11 can move it back to raised position. The operator then lifts the whole length of casing and slides it to the left of the machine so that another section of the casing can be formed into links. The links or individual sausages made by this machine are of uniform size and the product is superior to that hand made and the ends are more rounded and the casing can be more fully packed than when the links are to be made by hand.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

A device for forming a length of sausage casing into links comprising a supporting frame, including a plurality of longitudinally spaced transversely arranged members, a lower jaw supported by each member, each jaw having a V-shaped recess in its upper edge and a pair of downwardly diverging openings leading from said recess, a longitudinally extending trough supported by every other pair of transversely extending members, said trough being in substantial alignment with the V-shaped recesses, a frame having rear depending parts pivotally connected to rear parts of the supporting frame, a plurality of depending jaws carried by the frame for cooperating with the first-mentioned jaws for forming constrictions in the casing, each depending jaw having its lower end of forked construction with a space between the prongs of substantially inverted V-shape, the prongs entering the openings in the lower jaw when the frame is in lowered position, belts located in those spaces between the pairs of transversely extending members not occupied by the troughs, front and rear rollers and intermediate rollers supported by the supporting frame, depending portions at the front of the pivoted frame, rollers carried by said depending portions, each belt having a portion extending from a last mentioned roller to an intermediate roller, from which the belt passes to a front roller, these two portions of the belts separating when the frame is raised, said belt passing from said front roller around a rear roller back to the roller carried by the pivoted frame, said belts acting to twist those portions of the casing engaged thereby, and means for driving some of the rollers.

EDWARD GEORGE HODGE.